(12) United States Patent
Eifert (10) Patent No.: US 11,879,385 B2
(45) Date of Patent: Jan. 23, 2024

(54) ENGINE SYSTEM WITH FUEL-DRIVE THERMAL SUPPORT

(71) Applicant: Rolls-Royce North American Technologies Inc., Indianapolis, IN (US)

(72) Inventor: Andrew J. Eifert, Indianapolis, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 453 days.

(21) Appl. No.: 17/170,272

(22) Filed: Feb. 8, 2021

(65) Prior Publication Data

US 2022/0254531 A1 Aug. 11, 2022

(51) Int. Cl.
| | |
|---|---|
| *F02C 1/05* | (2006.01) |
| *F02C 6/18* | (2006.01) |
| *F02C 7/08* | (2006.01) |
| *G21D 1/02* | (2006.01) |
| *G21D 3/02* | (2006.01) |
| *G21D 1/00* | (2006.01) |
| *F02C 6/16* | (2006.01) |

(52) U.S. Cl.
CPC ............... *F02C 1/05* (2013.01); *F02C 6/18* (2013.01); *F02C 7/08* (2013.01); *F02C 6/16* (2013.01); *F05D 2220/50* (2013.01); *F05D 2220/76* (2013.01); *G21D 1/006* (2013.01); *G21D 1/02* (2013.01); *G21D 3/02* (2013.01)

(58) Field of Classification Search
CPC .. F01K 3/181; F01K 3/185; F02C 1/04; F02C 1/05; F02C 6/16; F02C 6/18; F02C 7/08; F05D 2220/50; F05D 2220/76
See application file for complete search history.

(56) References Cited

U.S. PATENT DOCUMENTS

| | | | |
|---|---|---|---|
| 3,864,919 A | 2/1975 | Frutschi | |
| 4,293,384 A * | 10/1981 | Weber | G21D 9/00 376/391 |
| 4,761,957 A | 8/1988 | Eberhardt et al. | |
| 5,165,239 A * | 11/1992 | Bechtel | F02C 3/36 60/683 |
| 5,799,490 A | 9/1998 | Bronicki et al. | |
| 9,752,462 B1 * | 9/2017 | Fletcher | F02C 1/10 |
| 11,499,474 B2 * | 11/2022 | Michalik | F01K 3/181 |

(Continued)

FOREIGN PATENT DOCUMENTS

GB 2612836 A * 5/2023 ............... B63G 8/08

OTHER PUBLICATIONS

Ka At-Attab and Za Zainal, Externally Fired Gas Turbine Technology: A Review, Aug. 8, 2014, 14 pages.

(Continued)

*Primary Examiner* — Craig Kim
(74) *Attorney, Agent, or Firm* — Barnes & Thornburg LLP (57) ABSTRACT

A power-generation system for a nuclear reactor includes a power unit, a reactor heat exchanger, and an auxiliary combustion system. The power unit produces compressed air that is heated by the reactor heat exchanger. The auxiliary combustion system includes an auxiliary combustor located external to the power unit and fluidly connected with the compressed air to increase the temperature of the compressed air.

19 Claims, 5 Drawing Sheets

(56) References Cited

U.S. PATENT DOCUMENTS

| | | | |
|---|---|---|---|
| 11,680,472 B2* | 6/2023 | Zhong | G01V 99/005 |
| | | | 702/14 |
| 2005/0097896 A1* | 5/2005 | Critchley | F02C 6/00 |
| | | | 60/776 |
| 2010/0050639 A1 | 3/2010 | Janus et al. | |
| 2010/0064688 A1 | 3/2010 | Smith | |
| 2015/0240665 A1* | 8/2015 | Stapp | F22B 3/08 |
| | | | 60/647 |
| 2019/0178111 A1* | 6/2019 | Uechi | F01K 23/106 |
| 2020/0191051 A1* | 6/2020 | Homison | F02C 7/143 |
| 2022/0029454 A1* | 1/2022 | Sweet | H02J 13/00002 |
| 2022/0252006 A1* | 8/2022 | Michalik | F02C 1/04 |
| 2023/0155388 A1* | 5/2023 | Fernando | H02J 3/381 |
| | | | 307/25 |

OTHER PUBLICATIONS

Colin F. McDonald and Charles R. Boland, The Nuclear Closed-Cycle Gas Turbine—Dry Cooled Commercial Power Plant Studies, Nov. 1979, https://www.osti.gov/servlets/purl/5664698, 21 pages.
International Atomic Energy Agency, Gas Turbine Power Conversion Systems for modular HTGRs, Aug. 2001, https://www-pub.iaea.org/MTCD/Publications/PDF/te_1238_prn.pdf, 216 pages.

* cited by examiner

ENGINE SYSTEM WITH FUEL-DRIVE THERMAL SUPPORT

FIELD OF THE DISCLOSURE

The present disclosure relates generally to externally-heated turbine engine systems, and more specifically to control systems for externally-heated turbine engine systems.

BACKGROUND

Externally-heated gas turbine engines may be used to power aircraft, watercraft, and power generators. Externally-heated gas turbine engines typically include a compressor and a turbine, but utilize an external heat exchanger and heat source to raise the temperature of the working fluid within the engine. In this arrangement, it is possible for no combustion products to travel through the turbine. This may allow externally-heated gas turbine engines to burn fuels that would ordinarily damage the internal components of the engine.

The compressor compresses air drawn into the engine and produces high pressure air for the external heat source. Heat is transferred to the high pressure air from the external heat source and the heated high pressure air is directed into the turbine where work is extracted to drive the compressor and, sometimes, a generator connected to an output shaft. Combustion products from the external heat source can be exhausted in an alternative region of the externally-heated turbine engine.

SUMMARY

The present disclosure may comprise one or more of the following features and combinations thereof.

A power-generation system for a nuclear reactor may include a power unit, a reactor heat exchanger, and an auxiliary combustion system. The power unit may include a generator and a turbine engine. The generator may produce electric energy. The turbine engine may be coupled to and configured to drive the generator. The turbine engine may include a compressor and a turbine. The compressor may be configured to receive and compress ambient air to produce compressed air. The turbine may be configured to receive the compressed air after the compressed air is heated to extract work from the compressed air and drive the generator, The reactor heat exchanger may be in fluid communication with the compressor and the turbine. The reactor heat exchanger may be configured to transfer heat continuously from the nuclear reactor to the compressed air to heat the compressed air during use of the power-generation system.

The auxiliary combustion system may be located external to the turbine engine. The auxiliary combustor may be configured to heat the compressed air to supplement the reactor heat exchanger. The auxiliary combustion system may include an auxiliary combustor and a controller. The auxiliary combustor may be fluidly connected to the compressor and the turbine and configured to mix a fuel with the compressed air. The auxiliary combustor may ignite the fuel and the compressed air to increase a temperature of the compressed air. The controller may be programmed to adjust a flow rate of the fuel mixed with the compressed air in the auxiliary combustor based on at least one of the temperature of the compressed air received by the turbine and a load demand on the generator.

In some embodiments, the auxiliary combustor may be fluidly connected to the turbine engine and the reactor heat exchanger downstream of the reactor heat exchanger and upstream of the turbine. In another embodiment, the auxiliary combustor may be fluidly connected to the turbine engine and the reactor heat exchanger downstream of the compressor and upstream of the reactor heat exchanger.

In other embodiments, the controller may be programmed to activate the auxiliary combustor in response to the temperature of the compressed air received by the turbine being below a predetermined temperature. In a further embodiment, the controller may be programmed to increase the flow rate of the fuel in response to the load demand on the generator being greater than a current load demand output. The controller may further be programmed to increase the flow rate of the fuel in response to a rate change of the load demand on the generator being greater than a load demand rate change threshold. In a further embodiment, the controller may be programmed to turn off the auxiliary combustor in response to the reactor heat exchanger heating the compressed air to a temperature greater than or equal to a predetermined temperature.

In some embodiments, the auxiliary combustion system may further include a bypass valve in fluid communication with the compressed air. The bypass valve may be configured to exhaust a portion of the compressed air away from the turbine. The controller may be programmed to turn off the auxiliary combustor and adjust the bypass valve to exhaust the portion of the compressed air based on the temperature of the compressed air received by the turbine being greater than a predetermined temperature. The controller may further be programmed to turn off the auxiliary combustor and adjust the bypass valve to exhaust the portion of the compressed air based on the load demand on the generator being less than a current load demand output.

In another embodiment, the controller may be programmed to activate the auxiliary combustor in response to the reactor heat exchanger heating the compressed air to a temperature below an operating temperature. In this embodiment, the auxiliary combustor may supplement the reactor heat exchanger during a startup mode of the system.

In some embodiments, the controller may be programmed to turn off the auxiliary combustor and operate the turbine engine at an idle speed. The controller may perform this operating condition in response to the reactor heat exchanger heating the compressed air to a temperature equal to or greater than the operating temperature.

According to another aspect of the present disclosure, a power-generation system may include a power unit, a reactor heat exchanger, and an auxiliary combustion system. The power unit may include a generator and a turbine engine. The generator may produce electric energy. The turbine engine may have a compressor configured to produce compressed air and a turbine configured to drive the generator. The reactor heat exchanger may be in fluid communication with the compressor and the turbine. The reactor heat exchanger may transfer heat from a nuclear reactor to the compressed air.

The auxiliary combustion system may include a controller and an auxiliary combustor. The auxiliary combustor may be located external to the turbine engine and fluidly connected to the turbine engine. The controller may be programmed to adjust a flow rate of a fuel provided to the auxiliary combustor to increase the temperature of the compressed air.

In some embodiments, the auxiliary combustor may be fluidly connected to the turbine engine and the reactor heat exchanger downstream of the reactor heat exchanger and upstream of the turbine. In a further embodiment, the auxiliary combustor may be fluidly connected to the turbine engine and the reactor heat exchanger downstream of the compressor and upstream of the reactor heat exchanger.

In another embodiment, the controller may be programmed to increase the flow rate of the fuel in response to a load demand on the generator being greater than a current load demand output. The controller may further be programmed to increase the flow rate of the fuel in response to a rate change of the load demand on the generator being greater than a load demand rate change threshold.

In other embodiments, the auxiliary combustion system may further include a bypass valve in fluid communication with the compressed air. The bypass valve may exhaust a portion of the compressed air away from the turbine to decrease a load on the generator. In some embodiments, the controller may be programmed to turn off the auxiliary combustor and adjust the bypass valve to exhaust the portion of the compressed air based on the temperature of the compressed air received by the turbine being greater than a predetermined temperature. The controller may further be programmed to turn off the auxiliary combustor and adjust the bypass valve to exhaust the portion of the compressed air based on a load demand on the generator being less than a current load demand output.

In some embodiments, the controller may be programmed to activate the auxiliary combustor in response to the reactor heat exchanger heating the compressed air to a temperature below an operating temperature. In this operating condition, the auxiliary combustor may supplement the reactor heat exchanger during a startup mode of the system.

According to another aspect of the present disclosure, a method of operating a power-generation system for a nuclear reactor may include the steps of compressing air with a compressor of a turbine engine and heating the compressed air with a reactor heat exchanger that is in thermal communication with the nuclear reactor. The method may further include the steps of mixing a fuel with the compressed air in an auxiliary combustor located external to the turbine engine and igniting the fuel and compressed air to increase a temperature of the compressed air. The method may further include the step of conducting the compressed air through a turbine, driving a generator with the turbine to produce electrical power, and controlling a flow rate of the fuel provided to the auxiliary combustor with a controller based on at least one of the temperature of the compressed air received by the turbine and a load demand on the generator.

In some embodiments, the method may further include the step of deactivating the auxiliary combustor based on the temperature of the compressed air being above a predetermined temperature. The method may also deactivate the auxiliary combustor based on the load demand on the generator being less than a current load demand output.

In another embodiment, the method may further include the step of opening a bypass valve to exhaust at least a portion of the compressed air away from the turbine based on the temperature of the compressed air received by the turbine being greater than a predetermined temperature. The method may also open the bypass valve to exhaust at least a portion of the compressed air away from the turbine based on the load demand on the generator being less than a current load demand output.

In other embodiments, the controller may be programmed to increase the flow rate of the fuel in response to the load demand on the generator being greater than a current load demand output. The controller may also be programmed to increase the flow rate of the fuel in response to a rate change of the load demand on the generator being greater than a load demand rate change threshold.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
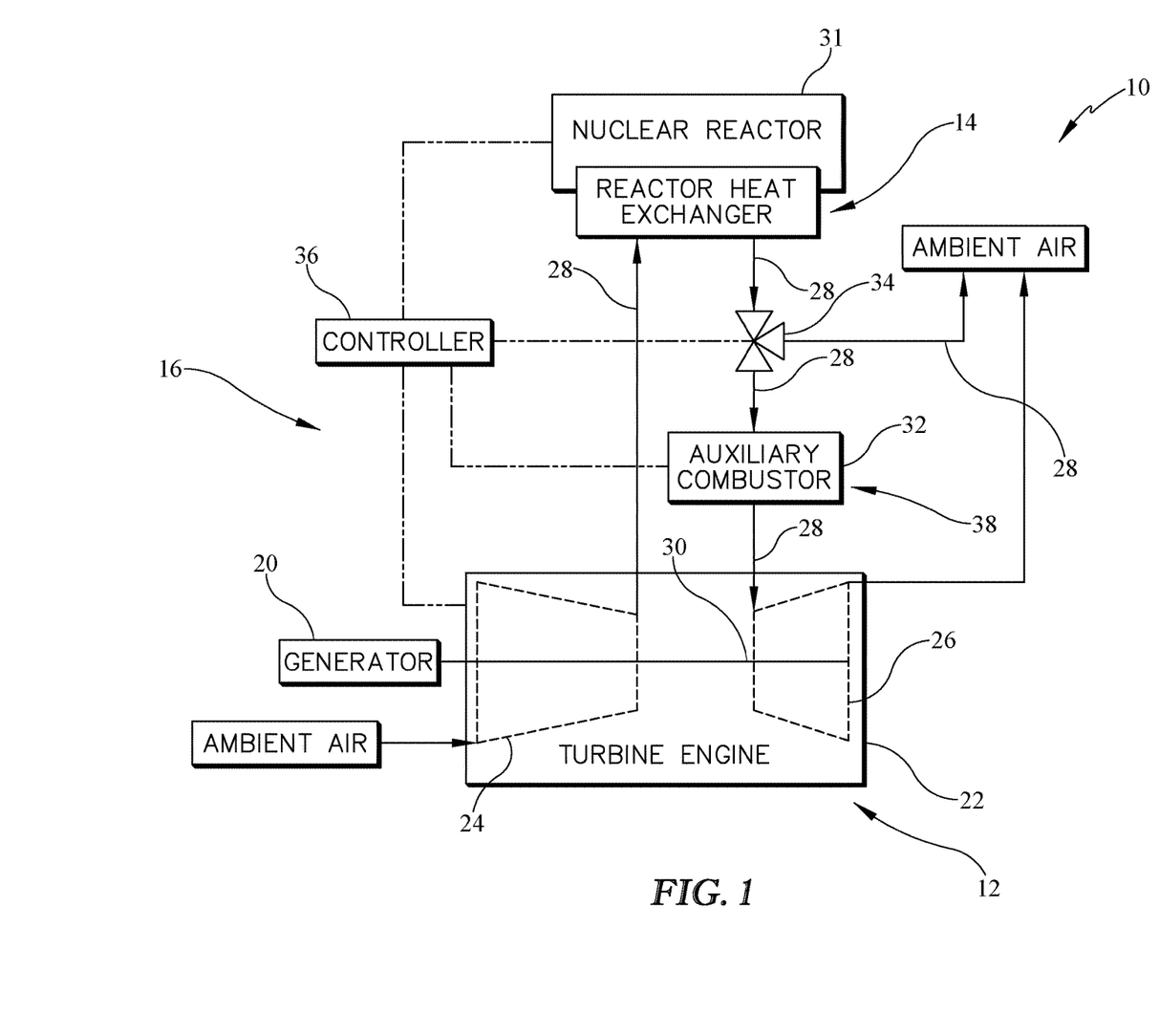
FIG. 1 is a diagrammatic view of a power-generation system according the present disclosure, the system uses heat from a nuclear reactor to run a turbine engine which, in turn drives a generator to produce electric energy, the system further includes an auxiliary combustion system having a bypass valve that exhausts a portion of the compressed air in the system to reduce a load demand on the generator, an auxiliary combustor fluidly connected to the turbine engine to add heat to the system in response to an increase in the load demand on the generator, and a controller to selectively operate the bypass valve and the auxiliary combustor to regulate the temperature of the compressed air received by the turbine.

An illustrative power-generation system 10 includes a power unit 12, a reactor heat exchanger 14, and an auxiliary combustion system 16 as shown in FIG. 1. The power unit 12 includes a turbine engine 22 having a compressor 24 and a turbine 26 fluidly connected to the reactor heat exchanger 14. The reactor heat exchanger 14 is located external to the turbine engine 22 and transfers heat to compressed air 28 produced by the compressor 24. The heated compressed air 28 is delivered to the turbine 26 so that the turbine 26 can extract power from the heated compressed air 28 and drive a generator 20 to produce electric power for a facility, for example.

The auxiliary combustion system 16 includes an auxiliary combustor 32 fluidly connected with the compressor 24 as shown in FIGS. 1-4. The auxiliary combustion system 16 is fluidly connected to the compressor 24 so that the auxiliary combustor 32 can increase the temperature of the compressed air 28 delivered to the turbine 26.

The auxiliary combustion system 16 further includes a bypass valve 34 and a controller 36 as shown in FIGS. 1-4. The bypass valve 34 can exhaust a portion of the compressed air 28 away from the turbine 26 to reduce the power produced by the turbine 26 and the corresponding electrical power produced by the generator 20, for example, in response to a reduced electrical demand on the generator by the facility. The controller 36 can individually and selectively operate the bypass valve 34 and the auxiliary combustor 32 based on at least one of the temperature of the compressed air 28 received by the turbine 26 and the load demand on the generator 20.

In other embodiments, the controller 36 operates the bypass valve 34 and the auxiliary combustor 32 based on a temperature of the compressed air 28 prior to entry into the turbine 26. For example, the controller 36 operates the bypass valve 34 and the auxiliary combustor 32 based on the temperature of the compressed air 28 exiting the compressor 24 or the temperature of the compressed air 28 exiting the reactor heat exchanger 14.

The power unit 12 includes the generator 20 and the turbine engine 22 as shown in FIG. 1. The turbine engine 22 includes the compressor 24, the turbine 26, and a shaft 30. The compressor 24 and the generator 20 are mechanically coupled via the shaft 30 to the turbine 26 and powered by the turbine 26. Ambient air is delivered to the compressor 24, which compresses the air and produces a working fluid of compressed air 28. The turbine 26 receives the compressed air 28 after the compressed air 28 is heated by the reactor heat exchanger 14. The heated compressed air 28 drives the turbine 26 to produce power that drives the compressor 24 and the generator 20 via the shaft 30. In some embodiment, the generator 20 may be replaced by a pump, a propelling device or other mechanical device that is driven by the turbine engine 22.

The generator 20 produces an electrical power load in kilowatts that may power an auxiliary such as a building, aircraft, or provide additional electricity to an electrical grid. During operation of the power-generation system 10, a load demand, in kilowatts, of electrical power on the generator 20 may vary such that the turbine 26 may need to provide more or less power to drive the generator 20 to meet the load demand.

In some running conditions, the load demand may increase or decrease from a current load demand output by a large amount in response to the auxiliary device powering up, powering down, or responding to a big operational change. A rate change of the load demand is high where the difference between a new load demand and the current load demand is greater than a load demand rate change threshold. The new load demand may be a higher or lower value than current load demand so that the load change represents an increase or decrease in overall load demand on the generator 20. The rate change of the load demand is low where the new load demand is similar to but not equal to the current load demand output of the generator 20 so that the difference between the new load demand and the current load demand is less than the load demand rate change threshold. The rate change of the load demand is zero where the new load demand and the current load demand output are equal.

The reactor heat exchanger 14 is fluidly coupled with the compressor 24 and the turbine 26 and located external to the turbine engine 22 as shown in FIG. 1. The reactor heat exchanger 14 transfers heat to the compressed air 28 provided by the compressor 24, and delivers the heated compressed air 28 to the turbine 26. In the illustrative embodiment, the reactor heat exchanger 14 is fluidly coupled with a nuclear reactor 31 to transfer heat from the nuclear reactor 31 to the compressed air 28. In the illustrative embodiment, the reactor heat exchanger 14 is a gas-to-gas heat exchanger and have heated nitrogen gas supplied to it on the nuclear reactor side. In some embodiments, the reactor heat exchanger 14 is fluidly coupled to an alternative heat source to transfer heat from the heat source to the compressed air 28. The alternative heat source may provide heat from solar energy or through burning any one of natural gas, diesel fuel, gasoline, aviation fuel, hydrogen, coal, wood, ethanol, or a biofuel.

The nuclear reactor 31 may be slow to initially generate and transfer heat through the reactor heat exchanger 14 and to the compressed air 28 in a startup mode. As such, other heat sources such as the auxiliary combustor 32 may be used to supplement the nuclear reactor 31. During steady operation of the power-generation system 10, the nuclear reactor 31 provides generally constant heat that is transferred to the compressed air 28 via the reactor heat exchanger 14. The nuclear reactor 31 may be able to adjust its heat output, however, at a slow rate compared to the rate desired by the turbine engine 22.

As such, if the rate change of the load demand on the generator 20 is high, the nuclear reactor 31 may not be able to respond quickly enough to provide heat the compressed air 28. The bypass valve 34 may exhaust a portion of the compressed air 28 relatively quickly so that the work extracted by the turbine 26 matches a lower load demand on the generator 20. The auxiliary combustor 32 may heat the compressed air 28 relatively quickly so that the work extracted by the turbine 26 matches a higher load demand on the generator 20.

The auxiliary combustion system 16 includes the auxiliary combustor 32, the bypass valve 34, and the controller 36 as shown in FIG. 1. The auxiliary combustion system 16 regulates the temperature of the compressed air 28 received by the turbine 26 so that the turbine 26 can produce power to meet the load demand on the generator 20, a rate change of the load demand on the generator 20, or to initially operate the turbine engine 22 at an idle speed. The auxiliary combustion system 16 is located external to the turbine engine 22.

The turbine engine 22 is configured to operate at least at an idle speed and may not be able to do so in response to the temperature of the compressed air 28 being below an operation temperature. The operation temperature of the compressed air 28 allows the turbine 26 to extract sufficient work from the compressed air 28 to operate the compressor 24 and the generator 20 at the idle speed.

The turbine engine 22 is configured to maintain a load demand on the generator 20 in response to the temperature of the compressed air 28 being at a predetermined temperature. The predetermined temperature is hotter than the operation temperature. If the compressed air 28 is below the predetermined temperature, the turbine 26 may extract insufficient work from the compressed air 28 so that the turbine 26 cannot provide sufficient power to the generator 20 for the generator 20 to meet the load demand. If the temperature of the compressed air 28 is above the predetermined temperature, the turbine 26 produces surplus power and drives the generator 20 to produce surplus electrical power above the load demand.

The auxiliary combustor 32 is fluidly connected with the compressor 24 and the turbine 26, and is located external to the turbine engine 22. In the illustrative embodiment in FIG. 1, the auxiliary combustor 32 is located between the reactor heat exchanger 14 and the turbine 26. The auxiliary combustor 32 provides a flow rate of a fuel 38 that mixes with the compressed air 28. The fuel 38 and compressed air 28 are ignited in the auxiliary combustor 32 and burn to increase the temperature of the compressed air 28. The auxiliary combustor 32 can rapidly increase the temperature of the compressed air 28 received by the turbine 26 in response to the temperature of the compressed air 28 being below the operating temperature for the startup mode or below the predetermined temperature for a load demand on the generator 20.

The flow rate of the fuel 38 may be varied in response to the rate change of the load demand on the generator 20. If the rate change of the load demand on the generator 20 is greater than the load demand rate change threshold, the flow rate of the fuel 38 can be increased to burn more fuel 38 with the compressed air 28. The increased burn in the auxiliary combustor 32 increases the temperature of the compressed air 28 and allows the turbine 26 to extract more work from the compressed air 28 to match the rate change of the load demand on the generator 20. In some embodiments, the auxiliary combustor 32 includes a pump that is adjusted to change the flow rate of the fuel 38 provided to the auxiliary combustor 32. In further embodiments, the fuel 38 can be natural gas, diesel fuel, gasoline, aviation fuel, hydrogen, coal, wood, ethanol, or a biofuel.

The bypass valve 34 is fluidly connected with the compressor 24 and the turbine 26, and is illustratively located between the reactor heat exchanger 14 and the auxiliary combustor 32 as shown in FIG. 1. In some embodiments, the bypass valve 34 may be located between the auxiliary combustor 32 and the turbine 26. The bypass valve 34 is configured to exhaust a portion of the compressed air 28 away from the turbine 26 to rapidly decrease the work extracted by the turbine 26 from the system 10 to meet a lower load demand on the generator 20.

The bypass valve 34 may be selectively operated in a closed position, a fully open position, or an intermediate open position. In the closed position, the bypass valve 34 exhausts no compressed air 28 so that all of the compressed air 28 is provided to the turbine 26. In the fully open position, the bypass valve 34 exhausts all of the compressed air 28 so that none of the compressed air 28 is received by the turbine 26. In the intermediate open position, a portion of the compressed air 28 is exhausted and a portion of the compressed air 28 is received by the turbine 26.

The bypass valve 34 can be opened to exhaust a portion of the compressed air 28 away from the turbine 26 in response to the temperature of the compressed air 28 being above the predetermined temperature for a load demand on the generator 20. If the rate change of the load demand on the generator 20 is less than the load demand rate change threshold, the bypass valve 34 can exhaust a higher portion of the compressed air 28 away from the turbine 26. The increased portion of the compressed air 28 exhausted via the bypass valve 34 decreases the load generated by the generator 20 more quickly.

The controller 36 is connected to the turbine engine 22, the nuclear reactor 31, auxiliary combustor 32, and the bypass valve 34 in the illustrative embodiment as shown in FIGS. 1-4. The controller 36 selectively operates each of the elements of the power-generation system 10 in response to a mode of the power-generation system 10, a temperature of the compressed air 28 at the inlet of the turbine 26, a load demand of the generator 20, a rate of change of the load demand on the generator 20, and/or a rotational speed of the shaft 30. The controller 36 may activate, deactivate, or vary the power level of any of the turbine engine 22 or the nuclear reactor 31. The controller 36 may vary the position of the bypass valve 34 between the fully open, closed, and intermediate positions. The controller may vary the flow rate of the fuel 38 provided to the auxiliary combustor 32.

Figure 2:
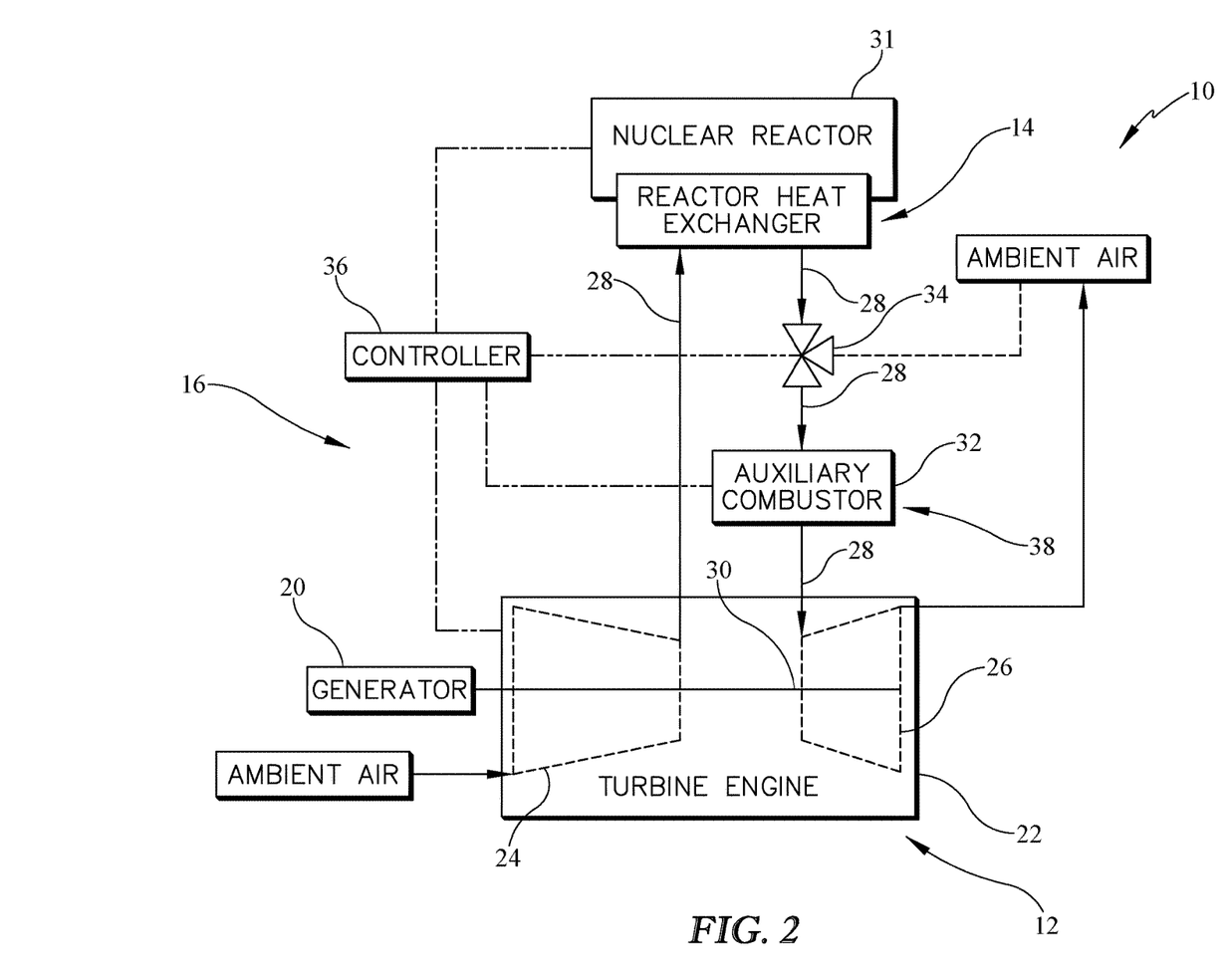
FIG. 2 is a diagrammatic view showing the system of FIG. 1 and suggesting that the bypass valve is closed so that all of the compressed air of the system is provided to the turbine and none of the compressed air is exhausted via the bypass valve, and the auxiliary combustor is activated to increase the temperature of the compressed air received by the turbine.

In the illustrative operating condition shown in FIG. 2, the controller 36 is operating the power-generation system 10 in a startup mode. In the startup mode, the nuclear reactor 31 is not operating at steady state and the reactor heat exchanger 14 may transfer insufficient heat to the compressed air 28 so that the turbine 26 is unable to power the turbine engine 22 at an idle speed. In the startup mode, the controller 36 activates the auxiliary combustor 32 to burn fuel 38 with the compressed air 28 to increase the temperature of the compressed air 28 to at least the operating temperature. The controller 36 may maintain the configuration as shown in FIG. 2 until the reactor heat exchanger 14 alone heats the compressed air 28 to the operating temperature.

In another operating condition, the controller 36 configuration shown in FIG. 2 is used to increase the temperature of the compressed air 28 in response to an increased load demand on the generator 20 and/or the temperature of the compressed air 28 being below the predetermined temperature. In this configuration, the controller 36 activates the auxiliary combustor 32 and operates the bypass valve 34 in the closed position. All of the compressed air 28 may be mixed with fuel 38 in the auxiliary combustor 32 and burned to increase the temperature of the compressed air 28 and then provided to the turbine 26. If the rate of change of the load demand on the generator 20 is greater than the load demand rate change threshold, then the controller 36 will operate the auxiliary combustor 32 to provide a higher flow rate of fuel 38 to increase the temperature of the compressed air 28 and allow the turbine 26 to extract more work from the compressed air 28.

The rotating assembly of the compressor 24, the turbine 26, and the shaft 30 rotate at varying speeds during operation of the power unit 12 causing the shaft 30 to vibrate at different frequencies. When the rotational speed of the shaft 30 is equal to a mode speed, the frequency from the vibrations in the shaft 30 are equal to or about equal to the natural frequency for a mode of the shaft 30. At or close to the natural frequency, the shaft 30 has maximum deflections and can cause large stresses in the shaft 30. It is beneficial for the power unit 12 to avoid rotating the components of the turbine engine 22 for extended periods of time within a mode speed range that includes the mode speed. The power unit 12 may accelerate or deaccelerate the shaft 30 quickly through the mode speed range to speeds that are faster or slower than the mode speed range to avoid imparting excessive stresses into the shaft 30 caused by the vibrations at the mode speed. In some embodiments, the rotating assembly of the turbine engine 22 may have a single operating speed and the power unit 12 may accelerate or deaccelerate the shaft 30 from an off-state where the shaft 30 is stationary through the mode speed range to the single operating speed.

In a further operating condition, the controller 36 configuration shown in FIG. 2 is used to quickly accelerate the rotational speed of the turbine engine 22 so that the shaft 30 does not rotate for an extended period of time within the mode speed range. In this configuration, if the system 10 had a demand for a higher rotational speed of the turbine engine 22 and the speed of the shaft 30 is below the mode speed range, then the controller 36 activates the auxiliary combustor 32 to quickly increase the temperature of the compressed air 28. The increase in temperature of the compressed air 28 allows the turbine 26 to extract more work from the compressed air 28 and convert the work into rotational speed of the turbine 26, shaft 30, and compressor 24, and accelerating the shaft 30. The controller 36 may detect the rotational speed of the shaft 30 and maintain the operation of the auxiliary combustor 32 until the rotational speed of the shaft 30 is above the mode speed range.

Figure 3:
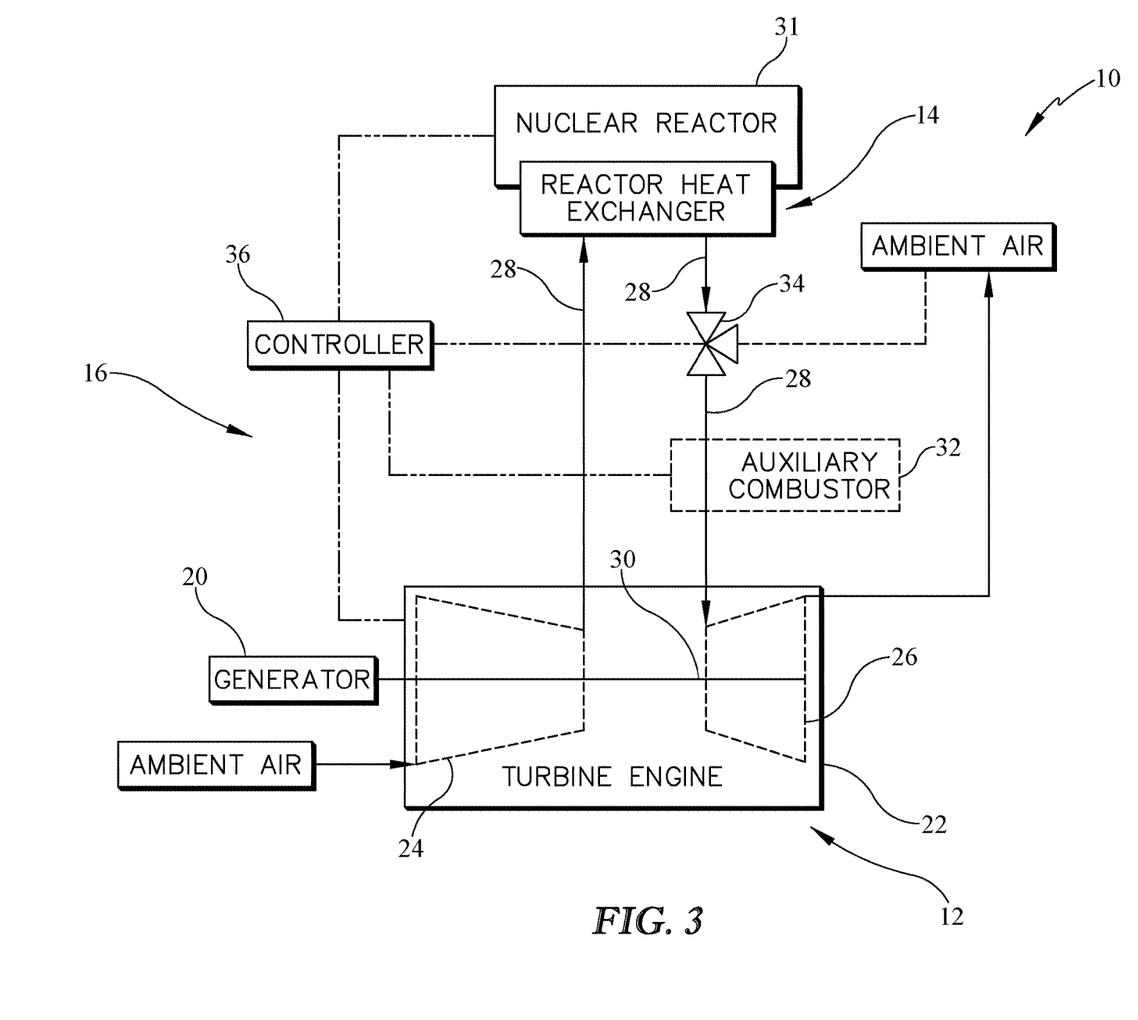
FIG. 3 is a diagrammatic view showing the system of FIG. 1 and suggesting that the bypass valve is closed so that all of the compressed air of the system is provided to the turbine, and the auxiliary combustor is deactivated such that it provides no heat to the compressed air received by the turbine.

In the illustrative operating condition shown in FIG. 3, a running mode may follow the startup mode. In the running mode, the controller 36 deactivates the auxiliary combustor 32 and operates the bypass valve 34 in the closed position in response to the reactor heat exchanger 14 heating the compressed air 28 to the operating temperature so that the turbine 26 produces sufficient power to operate the compressor 24 and the generator 20. The controller 36 may further operate the power-generation system 10 in the illustrative configuration of FIG. 3 in response to the reactor heat exchanger 14 heating the compressed air 28 to the predetermined temperature so that the turbine 26 produces sufficient power for the generator 20 to meet the load demand.

Figure 4:
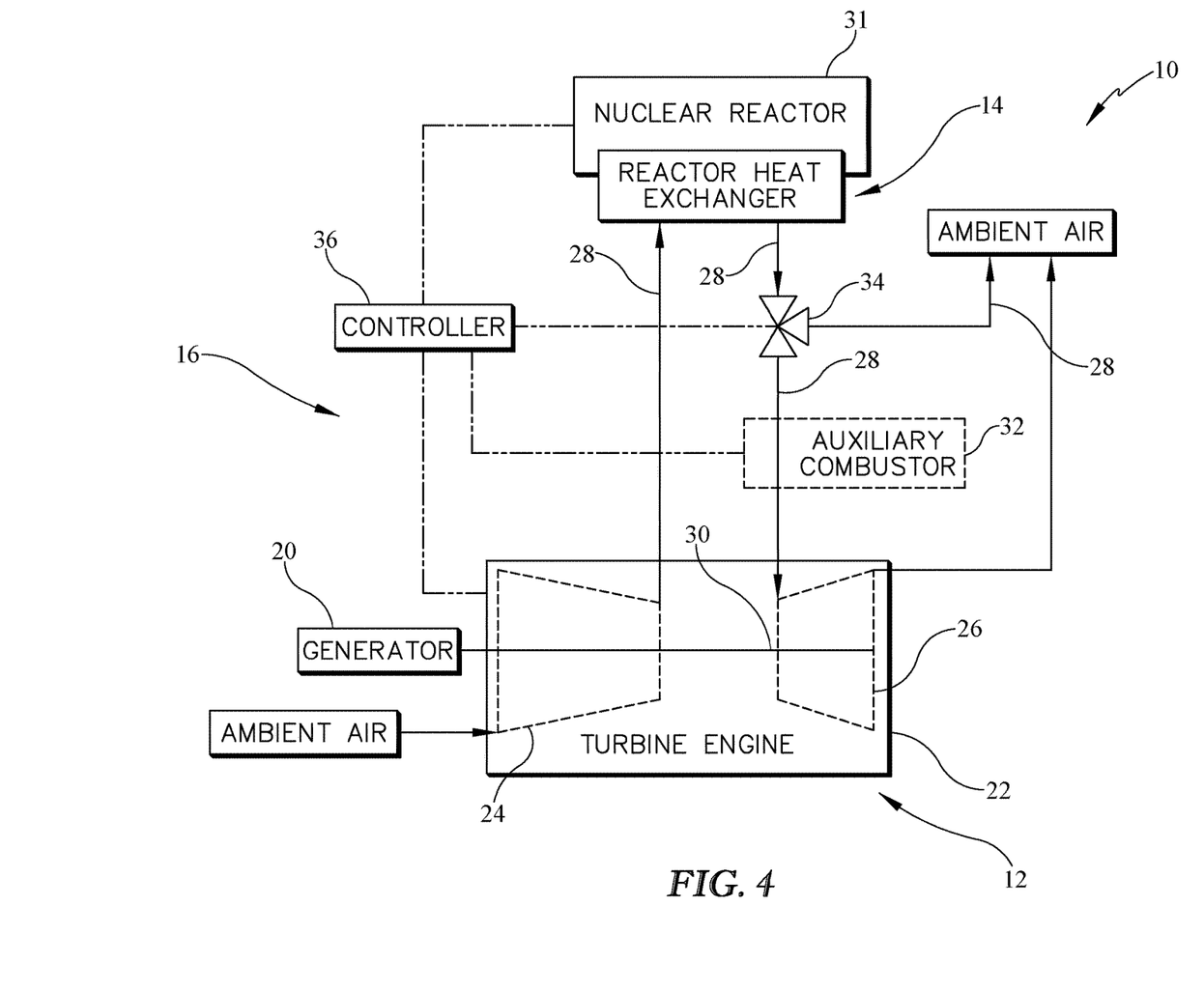
FIG. 4 is a diagrammatic view showing the system of FIG. 1 and suggesting that the auxiliary combustor is deactivated so that no additional heat is provided to the compressed air, and the bypass valve is open so that a portion of the compressed air is exhausted away from the turbine to decrease the electrical energy produced by the generator.

In the illustrative operating condition of FIG. 4, the controller 36 is operating the power-generation system 10 in a power-decrease mode, during which there is a relatively quick reduction in load demand on the generator 20. As an example, the load on the generator 20 may change in response to less electrical power being used by a building or equipment connected to the generator 20. In this configuration, the controller 36 deactivates the auxiliary combustor 32 and operates the bypass valve 34 in the intermediate open position so that a portion of the compressed air 28 exhausts away from the turbine 26. The remaining portion of the compressed air 28 is delivered to the turbine 26 and the turbine 26 extracts less overall work so that the generator 20 produces less electrical power to meet the lower load demand on the generator 20. If the rate of change of the load demand on the generator 20 is greater than the load demand rate change threshold to reduce the overall load demand, then the controller 36 will operate the bypass valve 34 in an increasingly open position so that a larger portion of the compressed air 28 is exhausted, and less compressed air 28 is provided to the turbine 26.

In another operating condition, the controller 36 maintains operation of the power-generation system 10 in the running mode as shown in FIG. 4. The controller 36 selectively operates the bypass valve 34 in an intermediate open position to exhaust a portion of the compressed air 28 away from the turbine 26 in response to the temperature of the compressed air 28 being above the predetermined temperature and providing surplus power from the turbine 26 to the generator 20. The controller 36 may maintain this configuration until the reactor heat exchanger 14 provides the compressed air 28 to the turbine 26 at a temperature about equal to the predetermined temperature.

In a further operating condition, the controller 36 configuration shown in FIG. 4 is used to quickly deaccelerate the rotational speed of the turbine engine 22 so that the shaft 30 does not rotate for an extended period of time at the mode speed. In this configuration, if the system 10 has a demand for a lower rotational speed of the turbine engine 22 and the speed of the shaft 30 is above the mode speed range, then the controller 36 operates the bypass valve 34 in the intermediate open position to quickly reduce the amount of power the turbine 26 can extract from the remaining portion of compressed air 28 not exhausted through the bypass valve 34. The reduced amount of compressed air 28 received by the turbine 26 prevents the turbine 26 from maintaining the current rotational speed of the shaft 30, and the compressor 24, shaft 30, and turbine 26 all reduce in rotational speed, and deaccelerate the shaft 30. The controller 36 may detect the rotational speed of the shaft 30 and maintain the operation of the bypass valve 34 until the rotational speed of the shaft 30 is below the mode speed range.

Figure 5:
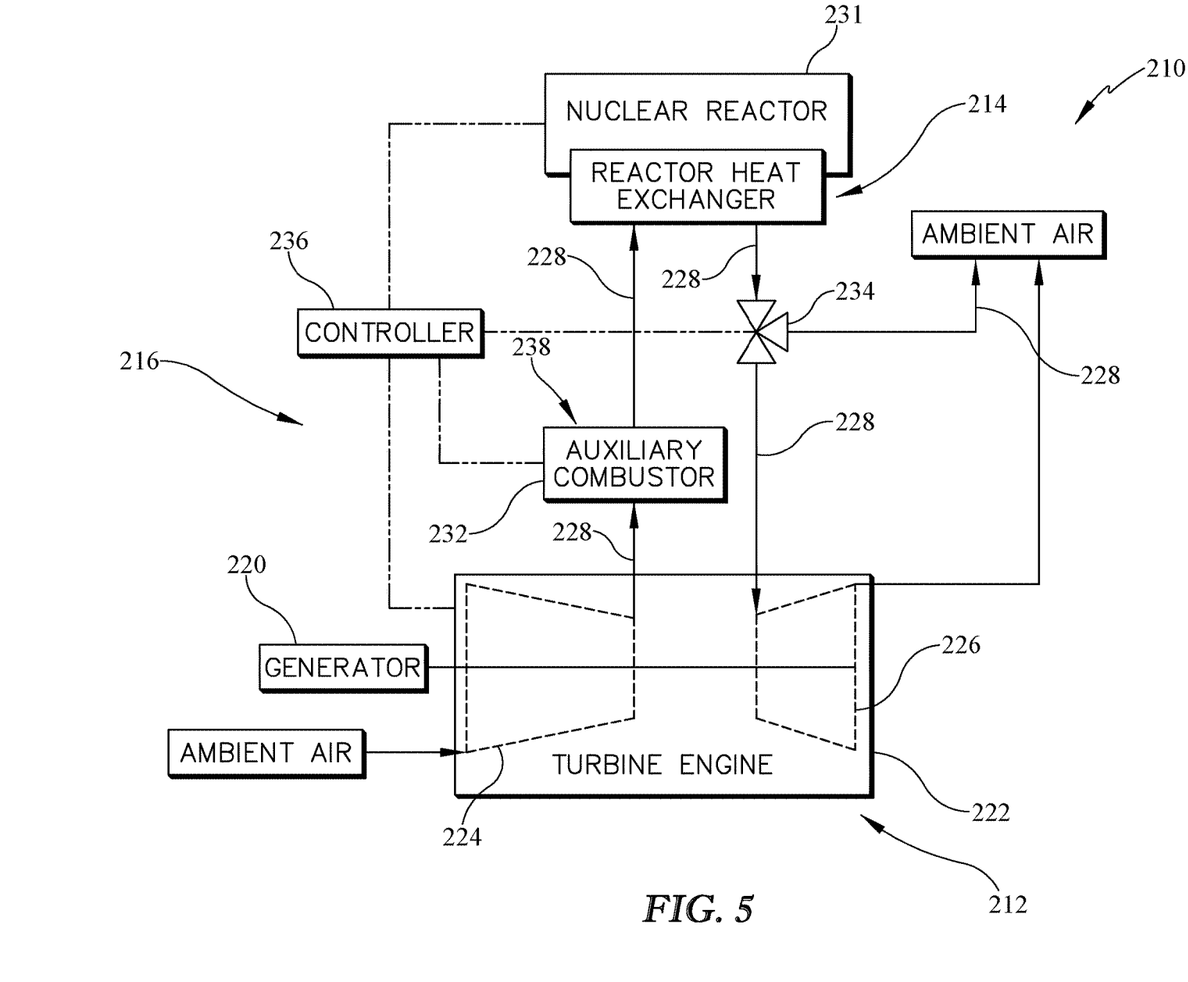
FIG. 5 is another diagrammatic view of a power-generation system including a generator coupled to the power unit, a nuclear reactor thermally coupled to a compressor and a turbine of the power unit, and an auxiliary combustion system having a controller, an auxiliary combustor fluidly connected to the power unit between the compressor and the reactor heat exchanger, and a bypass valve connected to the power unit between the reactor heat exchanger and the turbine.

Another embodiment of a power-generation system 210 in accordance with the present disclosure is shown in FIG. 5. The power-generation system 210 is substantially similar to the power-generation system 10 shown in FIGS. 1-4 and described herein. Accordingly, similar reference numbers in the 200 series indicate features that are common between the power-generation system 210 and the power-generation system 10. The description of the power-generation system 10 is incorporated by reference to apply to the power-generation system 210, except in instances when it conflicts with the specific description and the drawings of the power-generation system 210.

The power-generation system 210 includes a power unit 212, a reactor heat exchanger 214, and an auxiliary combustion system 216 as shown in FIG. 5. The power unit 212 includes a generator 220 and a turbine engine 222. The turbine engine 222 includes a compressor 224 and a turbine 226. The reactor heat exchanger 214 is fluidly coupled with the compressor 224 and the turbine 226 and located external to the turbine engine 222. The reactor heat exchanger 214 transfers heat to a compressed air 228 provided by the compressor 224, and delivers the heated compressed air 228 to the turbine 226. In the illustrative embodiment, the reactor heat exchanger 214 is fluidly coupled with a nuclear reactor 231 to transfer heat from the nuclear reactor 231 to the compressed air 228.

The auxiliary combustion system 216 includes an auxiliary combustor 232, a bypass valve 234, and a controller 236 as shown in FIG. 5. The auxiliary combustion system 216 regulates the temperature of the compressed air 228 received by the turbine 226 so that the turbine 226 can produce power to meet a load demand on the generator 220, a rate change of the load demand on the generator 220, or to initially operate the turbine engine 222 at an idle speed.

The auxiliary combustor 232 is fluidly connected with the compressor 224 and the turbine 226, and is located external to the turbine engine 222. In the illustrative embodiment in FIG. 5, the auxiliary combustor 232 is located between the compressor 224 and the reactor heat exchanger 214. The auxiliary combustor 232 provides a flow rate of a fuel 238 that mixes with the compressed air 228. The fuel 238 and compressed air 228 are ignited in the auxiliary combustor 232 and burn to increase the temperature of the compressed air 228. The bypass valve 234 is fluidly connected with the compressor 224 and the turbine 226, and is illustratively located between the reactor heat exchanger 214 and the turbine 226 as shown in FIG. 5. In some embodiments, the bypass valve 234 may be located between the compressor 224 and the reactor heat exchanger 214 upstream of the auxiliary combustor 232. In another embodiment, the bypass valve 234 may be located between the compressor 224 and the reactor heat exchanger 214 downstream of the auxiliary combustor 232.

The present disclosure may provide an auxiliary source 32 of heat flux into a gas flow 28 to assist a more slowly reacting heat flux source 14. In a system with a relatively slowly reacting heat flux, such as a nuclear reactor 31, the main heat source modulation may be slower than the end-use power demand fluctuations or may be practically unavailable for some aspect of operation. This may apply during initial startup of the system 10, where there may be several conflicting situations.

One situation may be where the main heat flux source 14 may use a high level of compressor discharge flow 28 while paradoxically providing very little heat flux into the flow. This may produce an energy imbalance which may need an external energy input. If the additional energy input was a completely separate engine or energy storage system, the weight and size of that separate system may be prohibitive.

In another situation, it may be unfavorable for a gas turbine engine to dwell in several bands of engine rotational speed due to rotor dynamics and other concerns. A relatively rapid acceleration may be used during startup, but the energy used to achieve the rapid acceleration may be lacking from the prime source of heat flux 14. As such, an external energy input 32 may be used. If the external energy input came from a separate engine or energy storage system, the weight and size of that separate system may be prohibitive.

During normal operation of the power-generation system 10, the end-use power demand may increase more rapidly than the prime source of heat flux 14 may achieve. Without an additional external source of support, the turbine engine 22 may slow and potentially enter no-dwell speed ranges and/or the exported power quality could fall below the threshold level such as brownout conditions or frequency excursions.

In some embodiments, the auxiliary combustion system 16 may inject and combust a fuel 38 into the gas stream 28 that is returning to the turbine engine 22 from an additional external heat flux source 32. The fuel 38 may combust to make up for the energy lacking in the situations outlined above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A power-generation system for a nuclear reactor, the power-generation system comprising
a power unit that includes a generator for producing electric energy and a turbine engine coupled to and configured to drive the generator, the turbine engine includes a compressor configured to receive and compress ambient air to produce compressed air and a turbine configured to receive the compressed air after the compressed air is heated to extract work from the compressed air and drive the generator,
a reactor heat exchanger in fluid communication with the compressor and the turbine and configured to transfer heat continuously from the nuclear reactor to the compressed air to heat the compressed air during use of the power-generation system, and
an auxiliary combustion system located external to the turbine engine and configured to heat the compressed air to supplement the reactor heat exchanger, the auxiliary combustion system including an auxiliary combustor and a controller, the auxiliary combustor fluidly connected to the compressor and the turbine and configured to mix a fuel with the compressed air and ignite the fuel and the compressed air to increase a temperature of the compressed air,
wherein the controller is programmed to adjust a flow rate of the fuel mixed with the compressed air in the auxiliary combustor based on at least one of the temperature of the compressed air received by the turbine and a load demand on the generator.

2. The power-generation system of claim 1, wherein the auxiliary combustor is fluidly connected to the turbine engine and the reactor heat exchanger downstream of the reactor heat exchanger and upstream of the turbine.

3. The power-generation system of claim 1, wherein the auxiliary combustor is fluidly connected to the turbine engine and the reactor heat exchanger downstream of the compressor and upstream of the reactor heat exchanger.

4. The power-generation system of claim 1, wherein the controller is programmed to activate the auxiliary combustor in response to the temperature of the compressed air received by the turbine being below a predetermined temperature.

5. The power-generation system of claim 4, wherein the controller is programmed to increase the flow rate of the fuel in response to one of the load demand on the generator being greater than a current load demand output and a rate change of the load demand on the generator being greater than a load demand rate change threshold.

6. The power-generation system of claim 1, wherein the controller is programmed to turn off the auxiliary combustor in response to the reactor heat exchanger heating the compressed air to a temperature greater than or equal to a predetermined temperature.

7. The power-generation system of claim 1, wherein the auxiliary combustion system further includes a bypass valve in fluid communication with the compressed air and configured to exhaust a portion of the compressed air away from the turbine, and the controller is programmed to turn off the auxiliary combustor and adjust the bypass valve to exhaust the portion of the compressed air based on at least one of the temperature of the compressed air received by the turbine being greater than a predetermined temperature and the load demand on the generator being less than a current load demand output.

8. The power-generation system of claim 1, wherein the controller is programmed to activate the auxiliary combustor in response to the reactor heat exchanger heating the compressed air to a temperature below an operating temperature to supplement the reactor heat exchanger during a startup mode of the system.

9. The power-generation system of claim 8, wherein the controller is programmed to turn off the auxiliary combustor and operate the turbine engine at an idle speed in response to the reactor heat exchanger heating the compressed air to a temperature equal to or greater than the operating temperature.

10. A power-generation system comprising
a power unit that includes a generator for producing electric energy and a turbine engine having a compressor configured to produce compressed air and a turbine configured to drive the generator, a reactor heat exchanger in fluid communication with the compressor and the turbine and configured to transfer heat from a heat source to the compressed air, and an auxiliary combustion system including a controller and an auxiliary combustor located external to the turbine engine and fluidly connected to the turbine engine, wherein the controller is programmed to adjust a flow rate of a fuel provided to the auxiliary combustor to increase the temperature of the compressed air, wherein the controller is programmed to increase the flow rate of the fuel in response to one of a load demand on the generator being greater than a current load demand output and a rate change of the load demand on the generator being greater than a load demand rate change threshold.

11. The power-generation system of claim 10, wherein the auxiliary combustor is fluidly connected to the turbine engine and the reactor heat exchanger downstream of the reactor heat exchanger and upstream of the turbine.

12. The power-generation system of claim 10, wherein the auxiliary combustor is fluidly connected to the turbine engine and the reactor heat exchanger downstream of the compressor and upstream of the reactor heat exchanger.

13. The power-generation system of claim 10, wherein the auxiliary combustion system further includes a bypass valve in fluid communication with the compressed air and configured to exhaust a portion of the compressed air away from the turbine to decrease a load on the generator.

14. The power-generation system of claim 13, wherein the controller is programmed to turn off the auxiliary combustor and adjust the bypass valve to exhaust the portion of the compressed air based on at least one of the temperature of the compressed air received by the turbine being greater than a predetermined temperature and a load demand on the generator being less than a current load demand output.

15. The power-generation system of claim 10, wherein the controller is programmed to activate the auxiliary combustor in response to the reactor heat exchanger heating the compressed air to a temperature below an operating temperature to supplement the reactor heat exchanger during a startup mode of the system.

16. A method of operating a power-generation system for a nuclear reactor, the method comprising, compressing air with a compressor of a turbine engine, heating the compressed air with a reactor heat exchanger that is in thermal communication with the nuclear reactor, mixing a fuel with the compressed air in an auxiliary combustor located external to the turbine engine and igniting the fuel and compressed air to increase a temperature of the compressed air, conducting the compressed air through a turbine, driving a generator with the turbine to produce electrical power, and controlling a flow rate of the fuel provided to the auxiliary combustor with a controller based on at least one of the temperature of the compressed air received by the turbine and a load demand on the generator.

17. The method of claim 16, further comprising deactivating the auxiliary combustor based on at least one of the temperature of the compressed air being above a predetermined temperature and the load demand on the generator being less than a current load demand output.

18. The method of claim 16, further comprising opening a bypass valve to exhaust at least a portion of the compressed air away from the turbine based on at least one of the temperature of the compressed air received by the turbine being greater than a predetermined temperature and the load demand on the generator being less than a current load demand output.

19. The method of claim 16, wherein the controller is programmed to increase the flow rate of the fuel in response to one of the load demand on the generator being greater than a current load demand output and a rate change of the load demand on the generator being greater than a load demand rate change threshold.

* * * * *